United States Patent Office 3,595,768
Patented July 27, 1971

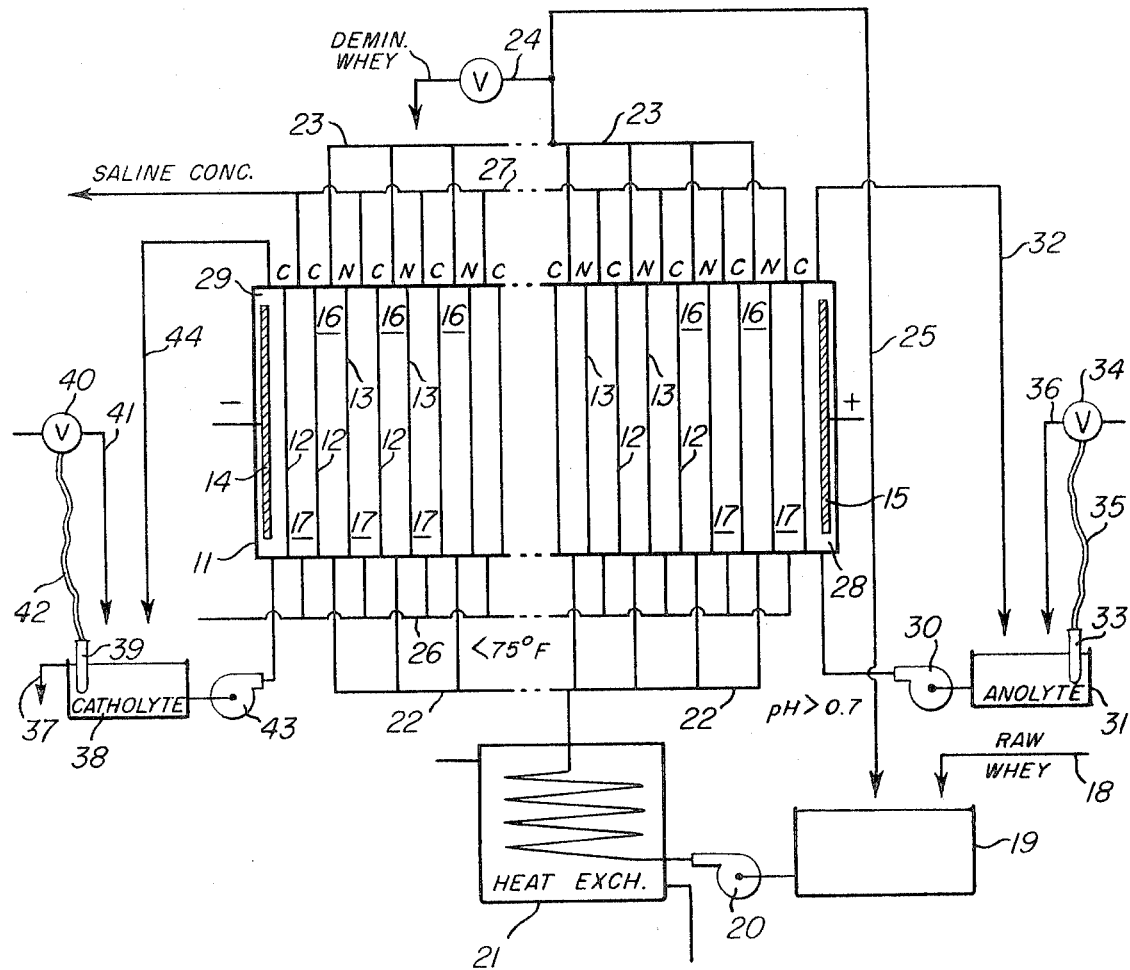

3,595,768
PREVENTION OF CALCIUM PRECIPITATION IN THE ELECTRODIALYTIC DEMINERALIZATION OF WHEY
John R. Scheder, Horicon, Wis., assignor to Purity Electrochemical Company, Mayville, Wis.
Filed Feb. 27, 1969, Ser. No. 803,014
Int. Cl. B01d 13/02
U.S. Cl. 204—180P         3 Claims

ABSTRACT OF THE DISCLOSURE

Whey is demineralized in a multichamber electrodialysis cell comprising ion exchange membranes and neutral membranes. Calcium precipitation occurring in the cell as a result of accidental whey leakage into the concentrating chambers is sharply reduced by temperature reduction of the recirculating whey streams, between passes, below 85° F.

---

This invention provides improvements in the method, process and apparatus for the demineralization of whey by electrodialysis.

It has been proposed to extract ash and lactic acid from whey by passing the whey solution through the deionization chambers of an electrodialysis cell comprising deionization chambers and concentrating chambers disposed in alternating sequence between a pair of electrodes and separated from one another by alternatingly arranged permselective anion membranes and cation membranes of ion exchange material, sulfuric acid serving as electrolyte.

More precisely defined, the membranes are microporous and comprise fixed electric charge sites by reason of which the pores of the anion membranes become anion-permeable and cation-passage-resistant, and the cation membrane pores become cation-permeable and anion-passage-resistant.

In testing such cells I observed that the membranes exhibit undesirable properties which are incompatible with commercial operation.

Firstly, it was observed that the anion membranes have a tendency to clog rapidly, as a result of which the cell output is progressively diminished.

Without attempting to ascribe a definite cause to such clogging, it seems reasonable to assume that the fixed positive charges in the anion membrane material contribute to the clogging, in view of the further fact that protein molecules have a slight negative charge.

Further, it was observed that the anion membranes tend to polarize at lower current densities than cation membranes, thereby reducing the current passing through the cell and limiting the cell output.

For the foregoing reasons, I concluded that anion membranes are advantageously eliminated altogether from a whey treating cell and replaced by neutral membranes having substantially no fixed charges.

Electrodialysis cells comprising membranes of two kinds, of which one kind consists of ion exchange material and the other kind is substantially neutral, are known from Kollsman Pat. 2,872,407 which discloses that in a cation membrane/neutral membrane system anions pass through the neutral membrane in preference to cations, as if the neutral membrane were actionally cation-passage-resistant, limitation on the passage of cations being the result of the property of the ionic liquid to remain ionically balanced.

The present invention is further based on the recognition that a cell in which permselective membranes of one polarity are replaced by neutral membranes is by no means an equivalent of the known cell comprising cation selective and anion selective membranes in alternating sequence.

One of the main reasons for the non-equivalency is that in a cell comprising neutral membranes in place of anion membranes, cations may pass from the anode chamber through the entire cell to the cathode, as they do not encounter cation-passage-resistant membranes. The aforementioned two kinds of cells therefore do not operate with substantially the same means, nor do they perform their functions in substantially the same manner.

The significance of this recognition in relation to the treatment of whey will presently become apparent.

In the operation of whey demineralizing electrodialysis cells with cation membranes and neutral membranes, it is observed that calcium precipitates under certain conditions and that this tendency is aggravated considerably if whey is present in the concentrate stream.

In commercial operation leaks, particularly membrane leaks or gasket leaks, occur occasionally. If such a leak merely results in loss of product, it might be tolerable, but since it tends to disable the cell by deposition of calcium, usually in the form of calcium phosphate it cannot be tolerated.

The calcium deposition frequently accompanies precipitation of protein, the latter being caused apparently by the presence of hydrogen cations which originate in the anode chamber and then tend to move towards the cathode through whey streams and concentrate streams of the cell without encountering anion membranes to block their path.

The prevention or reduction of whey precipitation forms the subject matter of a copending patent application Ser. No. 802,766, filed Feb. 27, 1969, and involves basically the principle of preventing the anolyte from assuming low pH values.

The causal interrelation of calcium precipitation and protein precipitation is not yet fully understood, but it is possible to establish a technical rule, the observation of which permits a cell of commercial output volume to be operated for periods between 12 and 24 hours without difficulties and at high current density values.

According to my observations, the precipitation of calcium is dependent mainly on two factors, temperature and presence of hydrogen ions.

In electrodialysis it is normally desirable to operate at elevated temperatures, preferably at temperatures as high as the membrane material can tolerate, in order to reduce the resistivity of the cell.

The present invention involves the recognition that the gain in economy by reduced resistivity is outweighed several times by an increase in resistivity due to calcium precipitation.

The method of demineralizing a solution stream containing whey protein and other whey constituents comprising flowing said stream through certain deionizing chambers of an electrodialysis apparatus in which deionizing chambers and concentrating chambers are arranged in alternating order, said chambers being defined, respectively, between a plurality of spaced alternatingly disposed hydraulically substantially impermeable membranes of two kinds, the one kind being selectively permeable to ions of one polarity and passage resistant to ions of the opposite polartiy, the membranes of the other kind being permeable to ions of said opposite polarity; flowing an electrolyte solution as a concentrating stream through the concentrating chambers lying between said certain chambers; applying at electrodes a direct electric potential to pass an electric current in series across said membranes and the chambers defined between them, the polarity being such as to cause ions of said opposite polarity in said whey stream to migrate away from the respective membrane bordering the respective stream, which membrane is passage resistant to said opposite polarity ion, said electrodes being disposed in electrode chambers; and passing electrolyte through said electrode chamber is improved according to the present invention in that said membranes of one kind are selectively cation permeable, in that said membranes of the other kind are substantially neutral, permitting cations to pass through a plurality of successive whey streams and concentrating streams, in that the whey stream is recirculated through the said certain chambers and in that the whey stream is cooled between passes through said certain chambers to maintain its inflow temperature into said certain chambers below 85° F.

The various objects, features and advantages of this invention will appear more fully from the detailed description which follows accompanied by examples and a drawing showing, for the purpose of illustration, a representative cell arrangement for practicing this invention. The invention also resides in certain new and original method steps, squences of steps and combinations of devices therefor.

Although the characteristic features of the invention which are believed to be novel will be particularly pointed out in the claims appended hereto, the invention itself, its objects and advantages, and the manner in which it may be carried out may be better understood by referring to the following description taken in connection with the accompanying drawing and examples forming a part of this disclosure.

In the drawing:

The figure is a diagrammatic illustration of a representative whey demineralizing cell incorporating the present invention.

In the following description and in the claims various details will be identified by specific names for convenience. The names, however, are intended to be generic in their application.

The accompanying drawing discloses certain details for the purpose of explanation of broader aspects of the invention, but it should be understood that certain structural details may be modified in various respects without departure from the principles of the invention and that the invention may be incorporated in, or practiced by, different cell systems than shown.

The electrodialysis cell 11 comprises a plurality of membranes of two kinds arranged in alternating sequence, more particularly cation-permeable, anion-passage-resistant membranes 12 of ion exchange material and neutral membranes 13 substantially free from fixed charges, cellophane being a representative example.

Electrodes 14 and 15 are located in the terminal chambers 28 and 29 of the cell, respectively, the electrode 14 being connected to a source of negative direct electrical potential (not shown), thus becoming a cathode, and electrode 15 being connected to a source of positive electrical potential, which makes it an anode.

The membrane arrangement results in the formation of chambers of two kinds, chambers 16 being deionization chambers and chambers 17 being concentrating chambers.

Whey to be demineralized is passed through the chambers 16 causing anionic and cationic components to migrate out of the cell through the bordering membranes under the action of the applied potential, the movement of ions resulting in an electric current flowing through the cell from electrode to electrode.

Raw whey flows through a supply duct 18 into a tank 19 whence it is withdrawn by a pump 20 which feeds it into a heat exchanger 21 for cooling, if required. The cool whey then flows into supply manifold 22 feeding the individual chambers 16.

Deionized whey flows from the deionizing chambers 16 into a collecting manifold 23. A fraction of the product may be withdrawn through a valved product duct 24, the balance being returned to the tank 19 through a return duct 25 for a repeated passage through the cell 11.

It is obvious that in order to maintain the whey level constant in the tank 19, the supply through duct 18 must match the withdrawal through duct 24.

A suitable electrolyte, for example sodium chloride solution, is fed into the concentrating chambers 17 through a supply manifold 26 and ion enriched solution is withdrawn from the concentrating chambers through a collecting manifold 27.

Anolyte is passed through the anode chamber 28 by a pump 30 from a tank 31 and anolyte effluent is returned to the tank 31 through a return duct 32.

The pH of the anolyte is controlled to remain within certain limits, a representative way of pH control being indicated by a pH sensor 33 connected to a control valve 34 by a line 35. The valve controls the admission into the tank 31 of a suitable make-up liquid, for example sodium hydroxide, from a supply duct 36. An overflow duct 37 controls the liquid level in tank 31.

The pH of the catholyte contained in a tank 38 is similarly controllable. For this purpose a sensor 39 is shown operating a valve 40 in a supply duct 41 through a line 42. The duct 41 preferably admits an acid in order to oppose gradual increase in the pH of the catholyte which is circulated by a pump 43 through the cathode chamber 29 returning through a duct 44.

The whey solution of which treatment examples are given below had a pH of 7 and contained 40 percent solids and 60 percent water. The solids comprised approximately 20 percent minerals, 22 percent protein, 45 percent lactose and a balance of carbohydrates, nitrates and other constituents.

EXAMPLE 1a

Whey solution was deionized in a 100-compartment cell constructed according to the drawing. There was no hydraulic leak. Potential 185 v. Current 90 amps. Whey inflow temperature 80° F. pH of anolyte effluent: between 0.7 and 1.0. Operating time 8 hours.

Results: After disassembly of the cell, protein precipitate was found in the first salt collecting stream and the first whey stream, counting from the anode chamber. Only traces of calcium precipitate were found in the chambers.

EXAMPLE 1b

Operational data identical with those of Example 1a except that the anolyte pH was 0.5.

Results: Heavy accumulation of protein precipitate. No apparent increase in the amount of calcium.

EXAMPLE 2

Operational data identical with those of Example 1a except as follows: Whey inflow temperature 100° F.

Results: The protein deposit was heavier than in Example 1 and the potential was gradually increased in order to maintain the current at 90 amps. No increase in the amount of calcium was observed.

EXAMPLE 3a

Example 1 was repeated with the following modification: A whey leak was simulated by gradual addition of whey solution to the concentrating stream. The concentrating stream was recirculated and included a tank into which whey was gradually added.

The current tended to decrease in proportion to the whey simulated leakage and required a potential increase to 230 v. After 13 hours of operation the cell failed by clogging.

Results: Calcium was found precipitated on all cation selective membranes and protein precipitate was found in the first salt collecting stream and the adjacent whey stream.

EXAMPLE 3b

A repetition of the operations of Example 3a at a temperature of 85° F. produced failure in 11 hours.

EXAMPLE 3c

A repetition of the operation of Example 3a at a temperature of 100° F. produced failure in two hours.

EXAMPLE 4a

In the apparatus of the drawing the pH of the anolyte effluent was maintained between 4.5 and 4.6. Again a protein leak was simulated. Operating temperature 100° F. A heavy deposit formed in the concentrating chambers on all cation membranes and a protein deposit was found in many of the whey chambers.

EXAMPLE 4b

Example 4a was repeated but the whey inflow temperature was reduced to 80°. No protein precipitate was found and the calcium deposit was less than one-half of that of Example 4a.

Other tests confirmed that under conditions of whey leakage, there is a slight and gradual increase in calcium deposit up to a temperature of 85° F. beyond which point the increase is steep and is accompanied by protein precipitation.

Comparing leakage operation and non-leakage operation at a given anolyte pH, it was observed that freedom from protein deposit is lost as soon as whey leakage occurs and causes calcium to deposit.

It is concluded and confirmed by tests that operation below 85° F., preferably around 80°, reduces calcium precipitation sharply.

Further, the likelihood of calcium precipitation increases in relation to the decrease in anolyte pH, and it was found that the pH range between 4 and 5 is most effective and is preferred in maintaining the supply of hydrogen ions at a minimum.

What is claimed is:

1. Method of demineralizing a solution stream containing whey protein and other whey constituents comprising flowing said stream through certain deionizing chambers of an electrodialysis apparatus in which deionizing chambers and concentrating chambers are arranged in alternating order, said chambers being defined, respectively, between a plurality of spaced alternatingly disposed hydraulically substantially impermeable membranes of two kinds, the one kind being selectively permeable to ions of one polarity and passage resistant to ions of the opposite polarity, the membranes of the other kind being permeable to ions of said opposite polarity; flowing an electrolyte solution as a concentrating stream through the concentrating chambers lying between said certain chambers; applying at electrodes a direct electric potential to pass an electric current in series across said membranes and the chambers defined between them, the polarity being such as to cause ions of said opposite polarity in said whey stream to migrate away from the respective membrane bordering the respective stream, which membrane is passage resistant to said opposite polarity ion, said electrode being disposed in electrode chambers; and passing electrolyte through said electrode chambers, the method being characterized in that (1) said membranes of the one kind are selectively cation permeable, that (2) said membranes of the other kind are substantially neutral, permitting cations to pass through a plurality of successive whey streams and concentrating streams, that (3) the whey stream is recirculated through the said certain chambers and that (4) the whey stream is cooled between passes through said certain chambers to maintain its inflow temperature into said certain chambers below 85° F.

2. Method according to claim 1 in which, in addition, a pH is maintained of the anolyte effluent above 0.7.

3. Method according to claim 1 in which the pH of the anolyte effluent is maintained between 4 and 5.

References Cited

UNITED STATES PATENTS

| | | | |
|---|---|---|---|
| 1,022,523 | 4/1912 | Whitney | 204—180P |
| 2,631,100 | 3/1953 | Aten et al. | 99—57 |
| 2,758,965 | 8/1956 | Block et al. | 204—180P |
| 2,848,403 | 8/1958 | Rosenberg | 204—180P |
| 2,872,407 | 2/1959 | Kollsman | 204—301 |
| 3,003,940 | 10/1961 | Mason et al. | 204—180P |
| 3,166,486 | 1/1965 | Hull | 204—180P |
| 3,325,389 | 6/1967 | Parsi et al. | 204—180P |
| 3,369,906 | 2/1968 | Chen | 99—77 |
| 3,440,159 | 4/1969 | McRae et al. | 204—180P |
| 3,484,356 | 12/1969 | Goujard | 204—180P |

JOHN H. MACK, Primary Examiner

A. C. PRESCOTT, Assistant Examiner

U.S. Cl. X.R.

99—57